US008744337B2

(12) United States Patent
Rajan et al.

(10) Patent No.: US 8,744,337 B2
(45) Date of Patent: Jun. 3, 2014

(54) APPARATUS AND METHODS OF ENHANCING RADIO PROGRAMMING

(75) Inventors: Rajeev D. Rajan, San Diego, CA (US); Jatin Kadakia, San Diego, CA (US); Jason Miller, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 517 days.

(21) Appl. No.: 12/139,922

(22) Filed: Jun. 16, 2008

(65) Prior Publication Data

US 2008/0313697 A1 Dec. 18, 2008

Related U.S. Application Data

(60) Provisional application No. 60/944,719, filed on Jun. 18, 2007.

(51) Int. Cl.
*H04H 40/36* (2008.01)
*H04B 1/18* (2006.01)

(52) U.S. Cl.
USPC .... 455/3.06; 455/3.01; 455/185.1; 455/186.1

(58) Field of Classification Search
None
See application file for complete search history.

(56) References Cited

U.S. PATENT DOCUMENTS

| | | | | |
|---|---|---|---|---|
| 5,214,792 | A | | 5/1993 | Alwadish |
| 5,239,681 | A | | 8/1993 | Parnall et al. |
| 5,465,088 | A | | 11/1995 | Braegas |
| 5,661,811 | A | | 8/1997 | Huemann et al. |
| 5,907,793 | A | * | 5/1999 | Reams ........................ 455/45 X |
| 5,949,492 | A | | 9/1999 | Mankovitz |
| 6,173,165 | B1 | * | 1/2001 | Ruhl et al. ................. 455/186.1 |
| 6,332,120 | B1 | | 12/2001 | Warren |
| 6,530,082 | B1 | | 3/2003 | Del Sesto et al. |
| 6,975,835 | B1 | | 12/2005 | Lake et al. |
| 7,231,176 | B2 | | 6/2007 | Levy |
| 2001/0025376 | A1 | | 9/2001 | Knobl |
| 2003/0054804 | A1 | | 3/2003 | Brandes et al. |

(Continued)

FOREIGN PATENT DOCUMENTS

| | | | |
|---|---|---|---|
| CN | 1241093 | A | 1/2000 |
| CN | 1507186 | | 6/2004 |

(Continued)

OTHER PUBLICATIONS

Davies P: "The radio system-traffic channel"Vehicle Navigation and Information.Systems Conference, 1989. Conferenc E Record Toronto, Ont., Canada Sep. 11-13, 1989, NewYork, NY, USA,IEEE, US, Sep. 11, 1989, pp. A44-A48, XP010034419.

(Continued)

*Primary Examiner* — Philip Sobutka
(74) *Attorney, Agent, or Firm* — Abdollah Katbab

(57) ABSTRACT

Apparatus and methods enhancing radio programming include receiving a broadcast radio transmission at a communication device. The broadcast radio transmission includes primary content and supplemental content having a relationship to the primary content. Further, the primary content includes a first audio data, while the supplemental content includes audio data. Additionally, the apparatus and methods include converting the supplemental content into converted supplemental content, maintaining the relationship to the primary content. Moreover, the converted supplemental content includes second audio data converted from the non-audio data. Thus, the described apparatus and methods allow the communication device to output signals for generating audible representations of both the primary content and the supplemental content.

45 Claims, 4 Drawing Sheets

(56) References Cited

U.S. PATENT DOCUMENTS

| | | | |
|---|---|---|---|
| 2003/0119441 | A1 | 6/2003 | Simons et al. |
| 2004/0110522 | A1 | 6/2004 | Howard et al. |
| 2004/0176061 | A1 | 9/2004 | Zehnle et al. |
| 2004/0198279 | A1 | 10/2004 | Anttila et al. |
| 2005/0020223 | A1 | 1/2005 | Ellis et al. |
| 2005/0054286 | A1 | 3/2005 | Kanjilal et al. |
| 2005/0086702 | A1 * | 4/2005 | Cormack et al. .............. 725/135 |
| 2005/0181838 | A1 | 8/2005 | Matsuda et al. |
| 2005/0249139 | A1 | 11/2005 | Nesbit |
| 2005/0271219 | A1 | 12/2005 | Bruelle-Drews |
| 2005/0287972 | A1 | 12/2005 | Christensen et al. |
| 2006/0045285 | A1 | 3/2006 | Bremermann |
| 2006/0083388 | A1 | 4/2006 | Rothschild |
| 2006/0128418 | A1 | 6/2006 | Quelle et al. |
| 2006/0197753 | A1 | 9/2006 | Hotelling |
| 2006/0264171 | A1 | 11/2006 | Kwon et al. |
| 2006/0268763 | A1 | 11/2006 | George |
| 2007/0010221 | A1 | 1/2007 | Howard et al. |
| 2007/0116297 | A1 | 5/2007 | Mishra |
| 2007/0143218 | A1 | 6/2007 | Vasa |
| 2007/0196802 | A1 | 8/2007 | Beletski et al. |
| 2007/0248055 | A1 | 10/2007 | Jain et al. |
| 2007/0250597 | A1 * | 10/2007 | Resner et al. ................. 709/218 |
| 2008/0036653 | A1 | 2/2008 | Huston |
| 2008/0212785 | A1 * | 9/2008 | Ullmann ........................... 381/2 |
| 2009/0045951 | A1 | 2/2009 | Rajan et al. |
| 2009/0282430 | A1 | 11/2009 | Gupta et al. |

FOREIGN PATENT DOCUMENTS

| | | | |
|---|---|---|---|
| CN | 1647551 | A | 7/2005 |
| CN | 1702605 | A | 11/2005 |
| EP | 0283708 | A2 | 9/1988 |
| EP | 0967748 | A2 | 12/1999 |
| EP | 0977389 | A2 | 2/2000 |
| EP | 1434371 | A2 | 6/2004 |
| JP | 6334548 | A | 12/1994 |
| JP | 8179793 | A | 7/1996 |
| JP | 8279796 | A | 10/1996 |
| JP | 8339490 | A | 12/1996 |
| JP | 9051511 | A | 2/1997 |
| JP | 9205379 | | 8/1997 |
| JP | 10502499 | T | 3/1998 |
| JP | 10256927 | A | 9/1998 |
| JP | 10327112 | A | 12/1998 |
| JP | 11355229 | | 12/1999 |
| JP | 2004509509 | A | 3/2004 |
| JP | 2004364245 | A | 12/2004 |
| JP | 2006094326 | A | 4/2006 |
| JP | 2006101561 | A | 4/2006 |
| JP | 2007025930 | A | 2/2007 |
| JP | 2009506802 | A | 2/2009 |
| JP | 2009534953 | A | 9/2009 |
| KR | 20000049405 | A | 8/2000 |
| KR | 1020020000563 | A | 1/2002 |
| KR | 20030090826 | A | 12/2003 |
| KR | 1020050026937 | | 3/2005 |
| KR | 1020050039536 | | 4/2005 |
| WO | WO0223773 | | 3/2002 |
| WO | WO02093400 | A1 | 11/2002 |
| WO | WO2004068730 | A1 | 8/2004 |
| WO | WO2005068494 | | 7/2005 |
| WO | WO2007032759 | A1 | 3/2007 |
| WO | 2007124441 | A2 | 11/2007 |

OTHER PUBLICATIONS

De Groot M T: "Rhine-Corridor An RDS-TMC Pilot for Radio Traffic Information" 19920902; 19920902-19920904, Sep. 2, 1992, pp. 8-13, XP010259475.

Herbert M: "The Road Traffic Advisor project" 19990303, Mar. 3, 1999, pp. 7/1-713, XP006500626.

International Search Report and Written Opinion—PCT/US2008/067230, International Search Authority—European Patent Office—Feb. 16, 2009 (071763U1).

Sammo Cho et al: "System and Services of Terrestrial Digital Multimedia Broadcasting (T-DMB)" IEEE Transactions on Broadcasting, IEEE Service Center, Piscataway, NJ, US, vol. 53, No. 1, Mar. 1, 2007, pp. 171-178, XP011172014.

Van Coile B et al: "Speech synthesis for the new Pan-European traffic message control system RDS-TMC" Speech Communication, Elsevier Science Publishers, Amsterdam, NL, vol. 23, No. 4, Dec. 1, 1997, pp. 307-317, XP004117221.

Nokia Press Release, "Kiss FM Begins Visua IRadio Broadcasts," Mar. 4, 2005.

RDS Forum 2005, R05036_1, "Radio text plus (RTplus) Specification," Version1.0, Jun. 13, 2005.

Translation of Office Action in China application 2008-0020637 corresponding to U.S. Appl. No. 12/139,922, citing CN1701520 dated Feb. 21, 2011 (071763U1CN).

Translation of Office Action in Japanese application 2010-513358 corresponding to U.S. Appl. No. 12/139,922, citing JP9051511, JP10327112, JP08339490, JP08179793, JP10502499, JP2006512022 and US20070116297 dated Dec. 7, 2010 (071763U1JP).

"WINRDS User Manual"R.V. R. Elettronica SpA. 2003. Version 1.0.

T. Ogawa et al., "LSI for RDS broadcasting, multiplex of digital data to FM signal." Nikkei Electronics. Aug. 24, 1987, No. 428. pp. 201-217.

U.S. RBDS Standard, "Specification of the radio broadcast data system (RBDS)", National Association of Broadcasters, Apr. 9, 1998, pp. 2-204.

Wright, Scott, "RBDS versus RDS—What are the differences and how can receivers cope with both systems" National Radio Systems Committee, Jan. 1998, pp. 2-11.

Taiwan Search Report—TW097122742—TIPO—Jan. 18, 2012.

* cited by examiner

APPARATUS AND METHODS OF ENHANCING RADIO PROGRAMMING

CLAIM OF PRIORITY UNDER 35 U.S.C. §119

The present application for patent claims priority to Provisional Application No. 60/944,719 entitled "APPARATUS AND METHODS FOR PROVIDING AM/FM-RADIO DATA SYSTEM (RDS) BASED TECHNOLOGIES" filed Jun. 18, 2007, and assigned to the assignee hereof and hereby expressly incorporated by reference herein.

BACKGROUND

1. Field

The described aspects relate generally to broadcast radio transmissions, and more particularly to enhancing user perception of the output of portions of a broadcast radio transmission on a communications device.

2. Background

Broadcast radio stations, such FM radio stations, may use a system known as a Radio Data System (RDS) or Radio Broadcast Data System (RBDS), both referred to herein as "RDS," to transmit supplemental information corresponding to their normal radio programming, e.g. music, talk, news, etc. RDS provides a standard protocol for several types of supplemental information transmitted by the broadcast radio stations, such as the identity of the particular radio station, the type of programming, and text information such as the name of an artist and/or song.

For example, broadcast radio stations transmit their programming and the supplemental information in the RDS format as distinct signals multiplexed onto a single channel. Radio receivers having RDS decoders, such as those included with some wireless communications devices or those in a vehicle, permit a user to listen to the transmitted programming and view the corresponding supplemental information on a display.

It is not always possible, however, for a user to view the display of supplemental information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The described aspects allow a user to experience, e.g. perceive, supplemental content in a broadcast radio transmission, thereby enhancing a radio listening experience.

For example, in one aspect, a method of enhancing radio programming comprises receiving a broadcast radio transmission at a communication device, wherein the broadcast radio transmission comprises primary content and supplemental content having a relationship to the primary content, wherein the primary content comprises a first audio data, wherein the supplemental content comprises a non-audio data. Further, the method includes converting the supplemental content into converted supplemental content having the relationship to the primary content, wherein the converted supplemental content comprises second audio data converted from the non-audio data.

Further, in another aspect, a computer program product for enhancing radio programming comprises a computer-readable medium including at least one instruction operable to cause a computer to receive a broadcast radio transmission at a communication device, wherein the broadcast radio transmission comprises primary content and supplemental content having a relationship to the primary content, wherein the primary content comprises a first audio data, wherein the supplemental content comprises a non-audio data. Further, the computer-readable medium also includes at least one instruction operable to cause the computer to convert the supplemental content into converted supplemental content having the relationship to the primary content, wherein the converted supplemental content comprises second audio data converted from the non-audio data.

In yet another aspect, at least one processor for enhancing radio programming comprises a first module for receiving a broadcast radio transmission at a communication device, wherein the broadcast radio transmission comprises primary content and supplemental content having a relationship to the primary content, wherein the primary content comprises a first audio data, wherein the supplemental content comprises a non-audio data. Additionally, the at least one processor includes a second module for converting the supplemental content into converted supplemental content having the relationship to the primary content, wherein the converted supplemental content comprises second audio data converted from the non-audio data.

In a further aspect, a communications device for enhancing radio programming comprises means for receiving a broadcast radio transmission, wherein the broadcast radio transmission comprises primary content and supplemental content having a relationship to the primary content, wherein the primary content comprises a first audio data, wherein the supplemental content comprises a non-audio data. Additionally, the device also includes means for converting the supplemental content into converted supplemental content having the relationship to the primary content, wherein the converted supplemental content comprises second audio data converted from the non-audio data.

In another aspect, a communications device for enhancing radio programming comprises a receiver operable to obtain a broadcast radio transmission. The broadcast radio transmission comprises primary content and supplemental content having a relationship to the primary content, wherein the primary content comprises a first audio data, and the supplemental content comprises a non-audio data. Additionally, the device includes a data converter operable to change the supplemental content into converted supplemental content having the relationship to the primary content, wherein the converted supplemental content comprises second audio data converted from the non-audio data.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
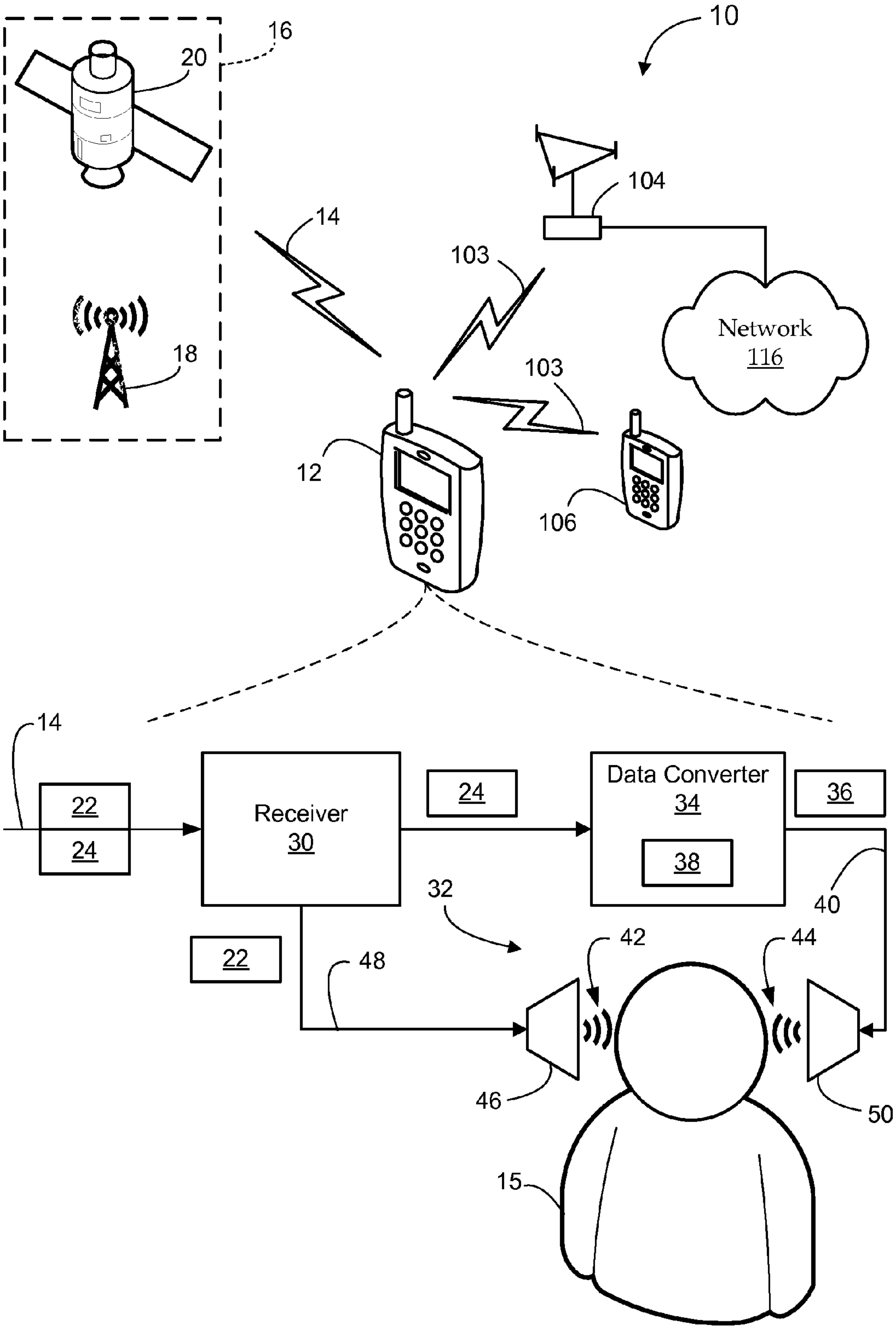
FIG. 1 is a schematic diagram of one aspect of a system of enhancing radio programming, including relevant components of a communication device operable to output primary content and supplemental content as audible sounds.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a communications device or terminal, which can be a wired communications device or terminal or a wireless communications device or terminal. A communications device or terminal can also be called a system, device, subscriber unit, subscriber station, mobile station, mobile, mobile device, remote station, remote terminal, access terminal, user terminal, terminal, communication device, user agent, user device, or user equipment (UE). A wireless communications device or terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. In particular, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The apparatus and techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, in one aspect, an enhanced broadcast radio system 10 includes a communication device 12 operable to receive a broadcast radio transmission 14 from a broadcast radio network 16 and output data carried by the transmission 14 for consumption of a user 15 of communication device 12. For example, broadcast radio network 16 may include one or more transmitters of radio programming, such as a terrestrial-based station 18 and/or a satellite-based station 20. Further, broadcast radio transmission 14 includes one or more carrier waves carrying primary content 22 and supplemental content 24, which has a relationship to the respective primary content 22. For example, primary content 22 may include radio programming in the form of music, talkshows, news, and/or any other audio data. On the other hand, supplemental content 24 may include non-audio data, such as text, graphics, images, video, etc. Moreover, supplemental content 24 may have one or any combination of the following relationships to primary content 22: an output time relationship, e.g. to insure outputting of the respective data on communication device at a certain time relative to one another; a descriptive relationship, e.g. supplemental content 24 may be data describing primary content 22 and/or information related to or associated with primary content 22; and an advertising relationship, e.g. supplemental content 24 may comprise an advertisement related to primary content 22, and/or an advertisement targeted to a user of communication device 12, and/or a general advertisement.

In one use case, for example, broadcast radio transmission 14 may include a radio broadcast according to a Radio Data System (RDS) protocol or a Radio Broadcast Data System (RBDS) protocol, both hereinafter referred to as RDS. Based on the RDS protocol, transmission 14 includes radio programming, referred to herein as primary content 22, and extra digital information, such as a name, call letters or frequency of the radio station, artist and track name, etc., referred to herein as supplemental information 24. As such, a properly configured radio receiver can generate audio representing the radio programming and display text representing the extra digital information, thereby enhancing the radio listening experience of a user.

Communication device 12 includes a receiver 30 for receiving broadcast radio transmission 14 and transforming it into information for use by communication device 12. In one particular aspect, receiver 30 is configured with RDS decoding capabilities that allow receiver 30 to parse primary content 22 and supplemental content 24, and forward these respective components for rendering by one or more output mechanisms of a user interface 32.

Recognizing that users 15 who are blind or who have vision impairment may not be able to perceive supplemental content 24 in the form of text on a display, communication device 12 further includes a data converter 34 operable to transform non-audio data into audio data. In particular, data converter 34 is operable to receive supplemental content 24 represented by non-audio data and, via a data conversion algorithm, generate converted supplemental content 36 represented by audio data. For example, data converter 34 may include a text-to-speech module 38 operable to generate audio signal 40 based on converted supplemental content 36, which corresponds to the originally-transmitted supplemental content 24, and which maintains the relationship with primary content 22. Audio signal 40 represents one or more spoken letters, numbers, and/or words originally represented as text. As such, audio signal 40 represents speech.

In a further aspect, user interface 32 is configured to allow user 15 to perceive a first audible sound 42 representing primary content 22 and a second audible sound 44 representing supplemental content 24. For example, a first user interface 46, such as a first speaker, is operable to receive from receiver 30 an audio signal 48 corresponding to primary content 22, while a second user interface 50, such as a second speaker, is operable to receive audio signal 38 corresponding to converted supplemental content 36 from data converter 34. As such, speakers 46 and 50 respectively output signals 48 and 40 as sounds 42 and 44, respectively. In one aspect, for example, sound 42 is music, news, talk, etc. of the radio programming, while sound 44 is speech, based on converted text, describing information having the relationship to the radio programming, such as the name, call letters or frequency of the radio station, the name of the artist and/or the track/song, advertising associated with the programming, sources for additional information, etc.

Further, in some aspects, first speaker 46 is physically separated from second speaker 50 to allow separation of sounds 42 and 44 to increase an ability of user 15 to distinguish between the sounds. For example, speaker 46 may correspond to a left channel speaker or a left-side earphone, while speaker 50 may correspond to a right channel speaker or a right-side earphone.

Thus, system 10 provides apparatus and methods that allow a blind or visually-impaired user 15 to have access to supplemental content 24 broadcast along with primary radio programming content 22, thereby allowing for full enjoyment of an enhanced broadcast radio transmission 14.

Figure 2:
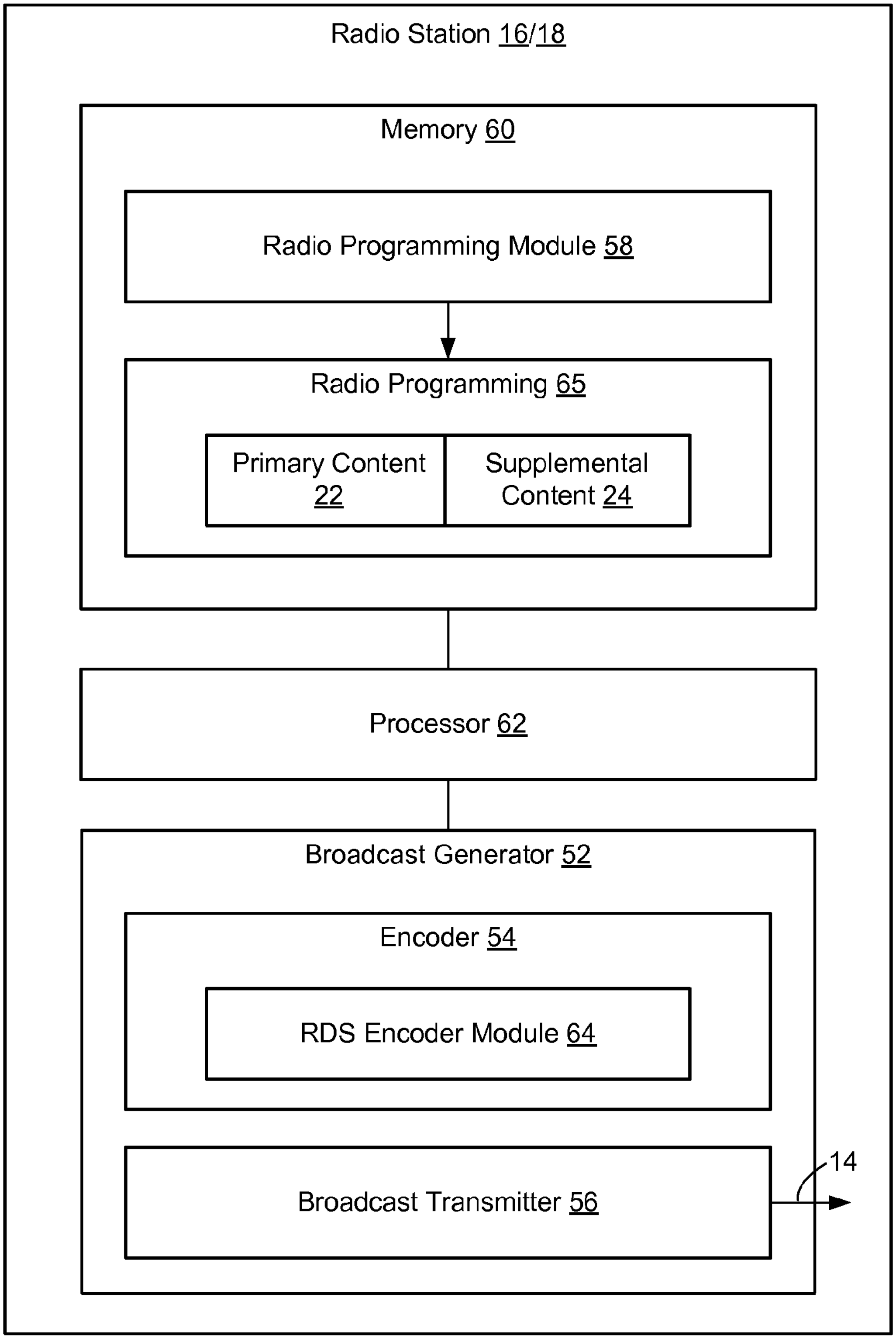
FIG. 2 is a schematic diagram of one aspect of a radio station of the system of FIG. 1.

Referring to FIGS. 1 and 2, broadcast radio network 16 may include any publicly or privately owned broadcast radio station that provides radio programming, such as a frequency modulation (FM) and/or amplitude modulation (AM) radio station and/or a satellite radio station. For example, broadcast radio transmission 14 includes modulated radio carrier signals that carry information representative of primary content 22, such as music, on a first carrier frequency. Further, transmission 14 may additionally include a modulated radio subcarrier signal that carries supplemental information 24 corresponding to the main carrier signal on a second carrier frequency different from the first carrier frequency.

For example, in an aspect of an FM band RDS system operating in the United States having channels in the range of about 87.5 MHz to about 108.0 MHz, the carrier frequency for primary content 22 may be between about 23 kHz and 53 kHz for stereophonic audio, and at 15 kHz or less for monophonic audio, while the carrier frequency for supplemental content 24 may be at about 57 kHz and allows 1187.5 bits/second data rate. Further, for example, in an AM band RDS system operating in the United States having channels in the range of about 520 kHz to about 1710 kHz, supplemental content 24 may be carried by subcarrier frequencies outside of the (human) audible range, e.g. between about 20 Hz and about 10 kHz, such as in a sub-audible frequency range. Additionally, for example, a satellite band RDS system may have channels in the in the gigahertz (GHz) range. For example, in North America, satellite radio is broadcast using the 2.3 GHz S band, while in other parts of the world satellite radio is broadcast using the 1.4 GHz L band. Further, in a satellite band RDS system, supplemental content 24 may be referred to as program associated data (PAD).

As such, referring specifically to FIG. 2, radio stations 18 and 20 include a broadcast generator 52 having one or more encoders 54 to encode primary content 22 and supplemental content 24, and one or more transmitters 56 to broadcast the content on respective carrier waves to receivers. Each radio station 18 and 20 may comprise any hardware, software, firmware, modules, data and instructions for obtaining primary content 22 and supplemental content 24, and generating broadcast radio transmission 14. For example, in one aspect, radio stations 18 and 20 may comprise a radio programming module 58 stored in a memory 60 and executable by a processor 62 to obtain primary content 22 and secondary content 24, and to generate radio programming 65 for transmission by broadcast generator 52 as broadcast radio transmission 14. In this aspect, radio programming 65 includes the primary audio or radio program represented by primary content 22 and the associated, enhanced information, such as RDS data, represented by supplemental content 24.

For example, in an RDS system, supplemental content 24 may include any RDS data, including but not limited to any one or any combination of: alternate frequency (AF) data, clock date and time (CT) data, enhanced other networks (EON) data, program identification (PI) data, program item number (PIN) data, extended country code (ECC) data, program service (PS) data, scrolling program service (SPS) data, program type (PTY) data, program type name (PTYN) data, regional links (REG) data, radio text (RT) or radio text plus (RTplus) data, travel announcements (TA) data, travel program (TP) data, traffic message channel (TMC) data, music/speech switch (M/S) data, transparent data channel (TDC) data, radio paging (RP) data, in house application (IH) data, emergency warning system (EWS) data, and data from free format groups, such as Open Data Applications (ODA).

As such, in an RDS system, encoder 54 includes an RDS encoder module 64 having any one or any combination of hardware, software, firmware, instructions, or algorithms operable to encode supplemental content 24 according to RDS specifications. For example, according to the RDS specifications, the RDS data is formatted in groups, and there are 16 groups divided into A and B types. These groups contain different data, such as the different types of supplemental information 22 listed above, e.g. PI, PS, PTY, PTYN, RT. An RDS encoder at broadcast radio station 16 and/or 18 may broadcast various combinations of the groups in a group sequence.

A group is formatted as 104 bits, and each group is divided into 4 blocks. A block contains 26 bits, and is divided into an Information Word and a Check Word+Offset Word. The Information Word contains 16 bits and carries data, while the Check Word+Offset Word contains 10 bits and is for error correction and synchronization.

Additionally, for each group: block 1 contains the PI code of the radio station; block 2 contains a Group Type Code that identifies the present transmitted group, a Version Flag that identifies the group as Type A or Type B, a TP flag, the PTY, and 5 individual bits; and blocks 3 and 4 contain group specific data. It should be noted that in B groups, the PI code is repeated in block 3 for better synchronization.

Further, a special type of group is called an Open Data Applications (ODA). ODA groups allow the creation of a huge number of specific applications based on RDS. To use an ODA application, a broadcaster sends a 3A group having a 16 bit code of an Application Identification (AID) to identify the ODA. Further, the 3A group includes 5 bits for reporting the groups that are going to be used with the ODA, and 16 bits that can be used for sending application-related information. For example, light applications can be embedded into the last 16 bits of the 3A group. Otherwise, the mentioned 5 bit portion specifies the other groups that are to be used for sending information, where the other groups may include: 3B, 4B, 5B, 6B, 7B, 8B, 9B, 10B, 11A, 11B, 12A, 12B and 13B. Suitably equipped target receivers can recognize the AID code and decode it in order to launch the application and access ODA information. The AID code is formally requested from the NAB (National Broadcasters Association) in North America, and the EBU (European Broadcasters Union) in Europe to insure the required coordination and interoperability among RDS enabled receivers.

Figure 3:
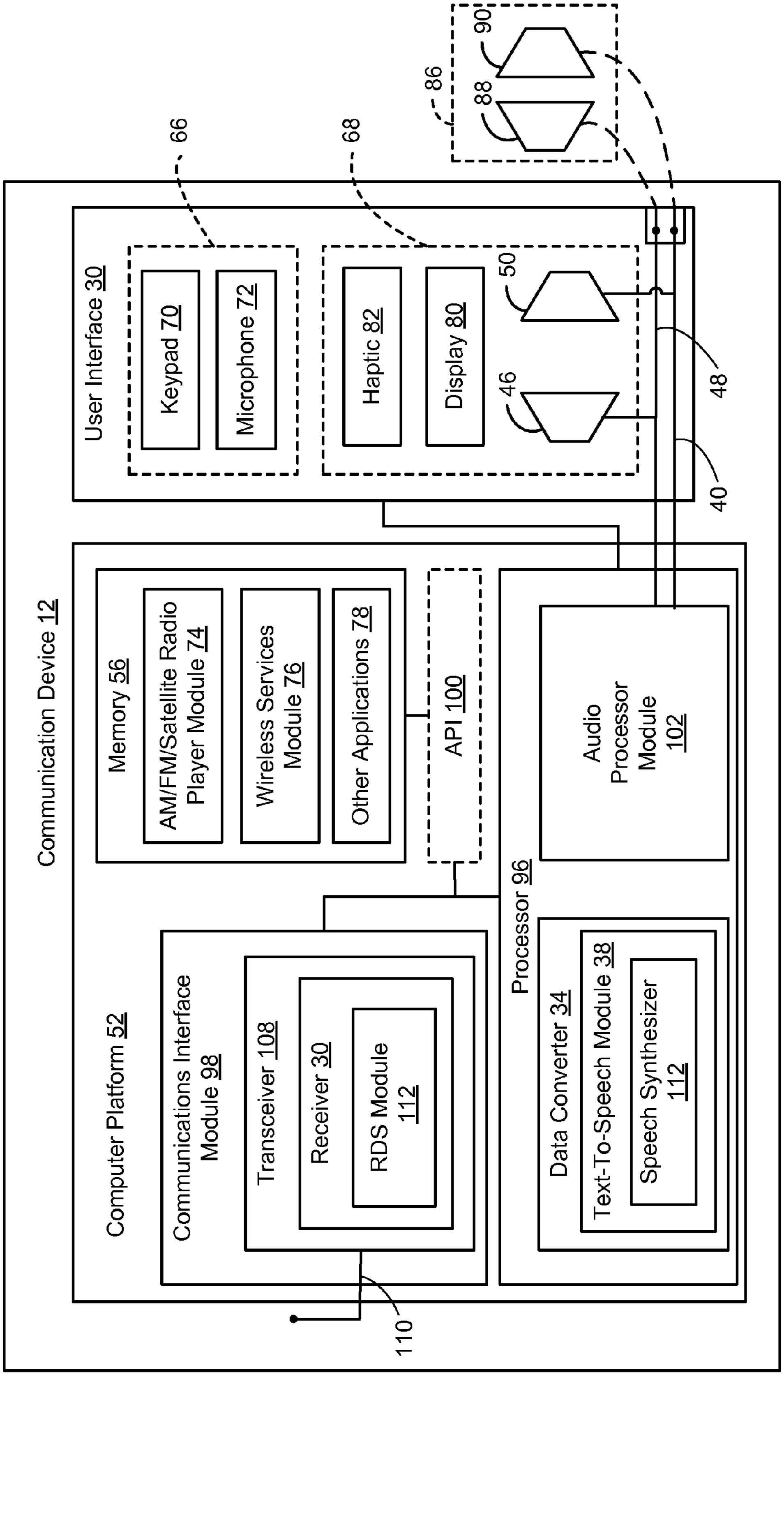
FIG. 3 is a schematic diagram of one aspect of a communication device of the system of FIG. 1.
Figure 4:
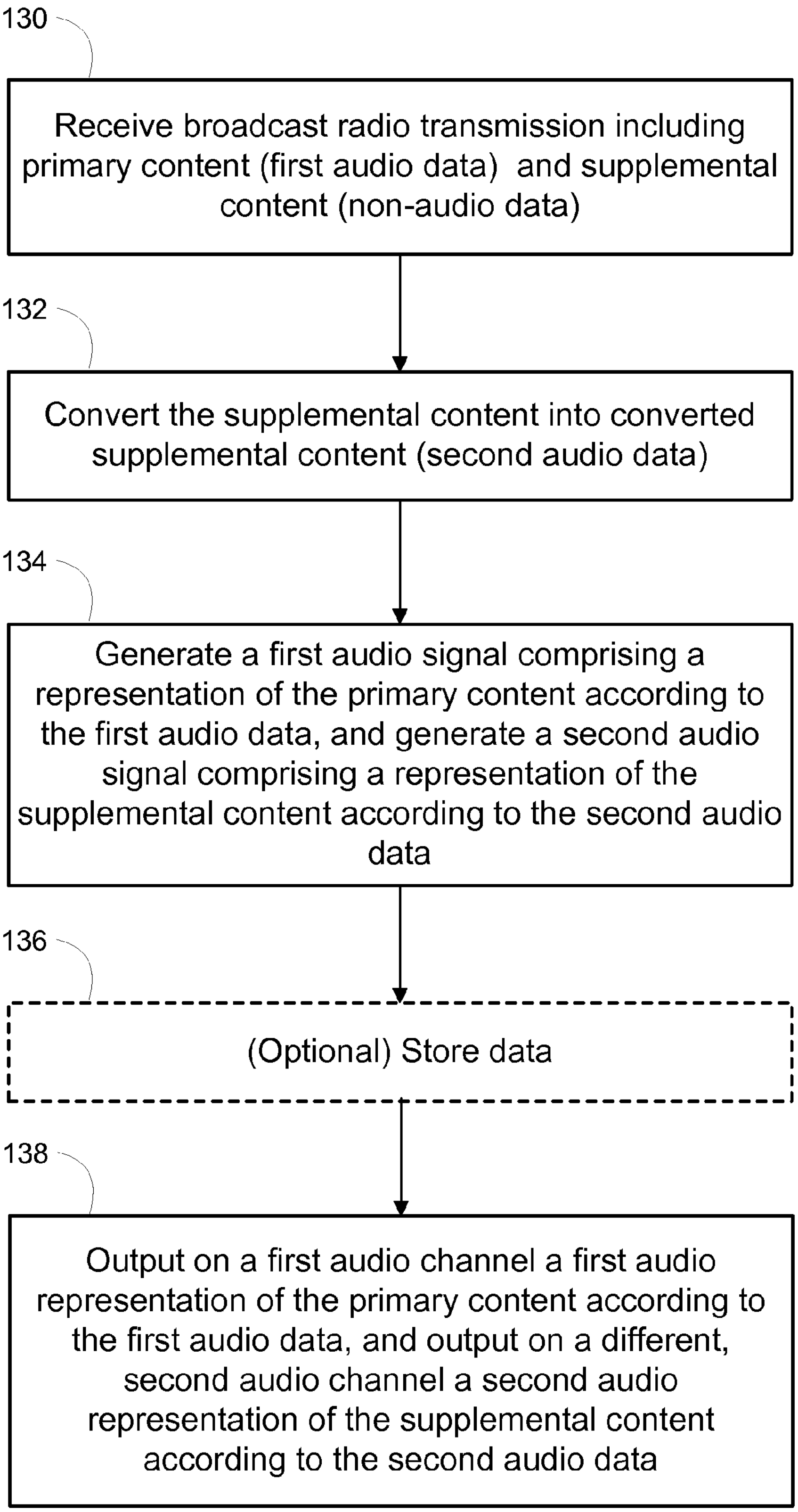
FIG. 4 is a flowchart of one aspect of a method of enhancing radio programming.

Referring back to FIG. 1 and additionally to FIG. 3, as previously noted, communication device 12 is configured to receive and decode broadcast radio transmission 14, convert non-audio supplemental content 24 to audio-based converted supplemental content 36, and generate sounds 42 and 44 respectively representative of primary content 22 and supplemental content 24.

More specifically, although communication device 12 is illustrated as a cellular telephone, it should be understood that communication device 12 may include any computerized device capable of receiving broadcast signals. Thus, system 10 may include one or more wired or wireless communication devices 12, which may include a cellular telephone, a Personal Digital Assistant (PDA), a satellite telephone, a palm computer, a Personal Communication Services (PCS) device, a portable gaming or music device, etc.

Further, user interface 32 of communication device 12 includes at least one input device 66 for generating inputs into communication device 12, and at least one output device 68 for generating information for consumption by user 15 of the communication device 12. For example, input device 66 may include one or any combination of mechanisms such as a key, keypad and/or keyboard 70, a mouse, a touch-screen display, a microphone 72, etc. In certain aspects, an input device 66 provides for user input to interact with an application, program or module, such as an AM/FM/Satellite radio player module 74, a wireless services module 76 and other applications 78, discussed below. Further, for example, output device 68 may include but is not limited to one or any combination of audio speakers 46 and 50, display 80, a haptic feedback mechanism 82 such as a vibrator, etc. Additionally, user interface 32 may include one or more output ports 84, for example, to which one or more remote output devices 86, such as speakers or earphones 88 and 90, may be wired or wirelessly connected to receive audio signals 48 and 40. For example, output ports 84 may include a mechanical connector, infrared transmitter/receiver, BLUETOOTH transmitter/receiver, IEEE 802.11x transmitter/receiver, etc.

Further, user interface 32 may be part of or may be connected to a computer platform 92 that includes a memory 94 having one or more modules, programs, or applications executable by a processor 96 and interacting with user interface 32 and a communications interface module 98.

Processor 96 controls the operation of communications device 12, for example, in cooperation with applications, programs, modules stored in memory 94. The control functions may be implemented, for example, in a single microprocessor, or in multiple microprocessors. Suitable microprocessors may include general purpose and special purpose microprocessors, as well as digital signal processors. Further, for example, processor 96 may be an application-specific integrated circuit (ASIC), or other chipset, logic circuit, or other data processing device. In some aspects, processor 96 or other data processing device such as ASIC may execute an application programming interface (API) layer 100 that interfaces with any resident applications, programs, or modules stored in memory 94. For example, API 100 may be a runtime environment executing on communication device 12. One such runtime environment is Binary Runtime Environment for Wireless® (BREW®) software developed by Qualcomm Incorporated of San Diego, Calif. Other runtime environments may be utilized that, for example, operate to control the execution of applications, programs, modules on a computing device.

Additionally, processor 96 may interface with or include one or more audio processor modules 102, which provide output signals 48 and 40 to speakers 42 and 44, respectively, and receives audio inputs from microphone 72. For example, audio processor module 102, which may include or cooperate with data converter 34, may include one or any combination of hardware, software, firmware, instructions, or algorithms operable to process primary content 22 and supplemental content 24 or converted supplemental content 36 to generate audio signals 48 and 40. It should be noted that primary content 22 and converted supplemental content 36 may be in either the same or in different audio formats, which can be recognized by audio processor module 102 and used to forward and/or generate audio signals appropriate for a given output device, such as speakers 42 and 44.

Memory 94 represents any type of memory associated with communications device 12. For example, memory 94 includes one or any combination of random access memory (RAM) and read-only memory (ROM), erasable ROM (EPROM), electronically erasable ROM (EEPROM), flash cards, or any memory common to computer platforms. Further, memory 94 may include one or more flash memory cells, or may be any secondary or tertiary storage device, such as magnetic media, optical media, tape, or soft or hard disk. For example, computer program instructions, codes and/or data utilized in the operation of communications device 12 may be stored in non-volatile memory, such as EPROM, EEPROM, and/or flash memory. Additionally, memory 94 may be implemented as discrete devices, stacked devices, or may be integrated with processor 96. Memory 94 may also include areas partitioned into and designated for use as temporary memory buffers, which may store data for rendering to user interface 32 and/or for use with any resident applications, programs, or modules stored in or executed from memory 94. Further, memory 94 may store AM/FM/Satellite radio player module 74 and the received or generated contents, such as primary content 22, supplemental content 24 and converted supplemental content 36, which are used by processor 96 in operating communication device 12.

Additionally, communications interface module 98 enables receipt of broadcast radio transmission 14, and in some aspects further allows for transmission and receipt of wireless communication messages 103 with a wireless communication network 104 or with other wireless devices 106. For example, in one aspect, communications interface module 98 includes one or more transceivers 108, e.g. transmitter and receiver components, coupled to one or more antennas 110 for transmitting and receiving short-range radio signals, for example to and from nearby devices, and/or long-range radio signals, for example to and from one or more base stations in a wireless communications network 104. Transceiver 108 may operate according to any known standard, including CDMA, cdmaOne, cdma2000, UMTS, Wideband CDMA, Global System for Mobile Communications (GSM), TIA/EIA-136, BLUETOOTH, UMB, WiMax, Wi-Fi, IEEE 802.11x, etc. Additionally, it should be noted that output ports 84 may be part of or may interconnect with communications interface module 98.

Receiver 36 may be included within transceiver 108, and receives and demodulates radio broadcast signal 14 transmitted by broadcast radio network 16. For example, receiver 36 may be configured to filter and demodulate RDS-based FM, AM or satellite radio broadcasts for output to the user over speakers 46 and 50. As such, in one aspect, receiver 36 may include an RDS decoder module 112 having any one or any combination of hardware, software, firmware, instructions, or algorithms operable according to RDS system standards to parse primary content 22 and supplemental content 24, and to decode the supplemental content.

As discussed above, communications device 12 includes data converter 34 having any one or any combination of hardware, software, firmware, instructions, or algorithms, such as text-to-speech module 38 having a speech synthesizer 114, operable to change supplemental content 24 to converted supplemental content 36. For example, text-to-speech module 38 and/or speech synthesizer 114 include hardware, software, and/or algorithms operable to generate audio signal 40 representing human speech created by concatenating pieces of recorded speech that are stored in a database, such as in memory 94, and/or by implementing a model of the vocal tract and other human voice characteristics to create a completely “synthetic” voice output. As such, data converter 34 converts the originally-received non-audio data into an audio data representing supplemental content 24 to allow a user to experience non-visual supplemental content 24 when the user cannot see or view output device 68 but can hear an audible output from communication device 12. Although illustrated as a part of processor 96, data converter 34 may be embodied in one or more places anywhere on computer platform 92.

Additionally, in some alternate aspects, data converter 34 may include hardware, software, firmware, instructions, or algorithms operable to convert audio data, such as primary content 22, or such as some forms of supplemental content 24, to text or image data for display on output device 68. As such, data converter 34 may further allow communication device 12 to convert audio data to text/image data to allow a user to experience the audio data when they cannot hear but can see an output from communication device 12.

To receive and act upon broadcast radio transmission 14, in one aspect, computer device 12 may execute AM/FM/Satellite radio player module 74 to tune to a particular radio channel of a broadcast radio station of interest. For example, AM/FM/Satellite radio player module 74 may include one or any combination of hardware, software, firmware, instructions, or algorithms operable to generate interactive graphical user interfaces on display 80 that allows user 15 to tune to radio stations, save favorite stations, adjust volume of sounds 42 and 44, save supplemental content 24 to memory 94 for later recall, and to perform any other interactions involved with listening to a radio broadcast.

In other aspects, computer device 12 may execute wireless services module 76 to exchange messages 103 with wireless communication network 104 and/or other devices 106, and to access information on other networks 116, such as the Internet. For example, wireless services module 76 may include one or any combination of hardware, software, firmware, instructions, or algorithms operable to provide communication device 12 with one or any combination of services such as a voice call application, a data call application, a messaging application, a group call application, a multimedia (music and/or video) application, a personal information manager, etc.

Additionally, in other aspects, computer device 12 may execute other applications 78 operable to provide any other functionality to communication device 12, such as calendar applications, calculators, business or computing applications, and any other functionality operable on a computerized device.

In operation, communication device 12 may be utilized to allow a blind or visually-impaired user 15 to perceive supplemental content 24 of an enhanced radio broadcast, such as transmission 14.

As such, in one aspect, a method of enhancing radio programming for the blind or visually impaired comprises receiving a broadcast radio transmission at a communication device (Block 130). The broadcast radio transmission includes primary content and supplemental content having a relationship to the primary content, wherein the primary content comprises a first audio data and the supplemental content comprises a non-audio data.

In some aspects, the receiving may include receiving primary content on a first frequency and receiving the supplemental content on a second frequency. More specifically, for example, in some aspects, the receiving includes receiving a radio program signal carried on a first frequency modulated radio wave having a first carrier frequency, and receiving radio data system information carried on a second frequency modulated radio wave having a second carrier frequency different from the first carrier frequency.

Alternatively, in other aspects, the receiving may include receiving a radio program signal carried on a first amplitude modulated radio wave having a first carrier frequency, and receiving radio data system information carried on a second amplitude modulated radio wave having a second carrier frequency different from the first carrier frequency, wherein the second carrier frequency is outside of an audible frequency range, such as in a subaudible frequency range.

In yet other aspects, the receiving includes receiving satellite-generated radio programming.

Further, it should be noted that the relationship between the primary content and the supplemental content may include one or any combination of an output time relationship, a descriptive relationship, and/or an advertising relationship. Further, in an RDS system implementation, the primary content may be radio programming and the supplemental content may be textual information, such as radio text.

Additionally, the method may including converting the supplemental content into converted supplemental content having the relationship to the primary content, wherein the converted supplemental content comprises second audio data converted from the non-audio data (Block 132). For example, the method may include processing of the supplemental content by a speech synthesizer to convert the non-audible data, such as text data, to audible data, such as speech. Further, in a RDS system implementation, the primary content may be radio programming, such as music, talk, news, etc., and the supplemental content may be radio text, which is converted to speech.

Additionally, the method may include generating a first audio signal comprising a representation of the primary content according to the first audio data, and generating a second audio signal comprising a representation of the supplemental content according to the second audio data (Block 134).

In some aspects, the generating includes generating the first audio signal further comprises processing the first audio data according to a primary audio format, and wherein generating the second audio signal further comprises processing the second audio data according to a supplemental audio format. Further, for example, the primary audio format may be different from or the same as the supplemental audio format.

Optionally, the method may include storing data, such as the received content, the converted supplemental content, and/or the generated audio signals (Block 136). For example, any data received or generated by communication device in carrying out the method may be stored at any time.

Additionally, the method may include outputting on a first audio channel a first audio representation of the primary content according to the first audio data, and outputting on a second audio channel a second audio representation of the supplemental content according to the second audio data, wherein the second audio channel is different from the first audio channel (Block 138).

In some aspects, the outputting may include outputting on the first audio channel further comprises outputting on a left audio channel or a right audio channel, and wherein outputting on the second audio channel further comprises outputting on an opposite one of the left audio channel or the right audio channel.

In other aspects, the outputting may include outputting on a first user interface a first audio representation of the primary content according to the first audio data, and outputting on a second user interface a second audio representation of the supplemental content according to the second audio data, wherein the second user interface is different from the first user interface.

Thus, the described aspects include apparatus and methods of enhancing radio programming for the blind or visually impaired.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of enhancing radio programming, comprising:

receiving a broadcast radio transmission at a communication device, wherein the broadcast radio transmission comprises primary content and supplemental content having an output time relationship to the primary content, wherein the primary content comprises a first audio data, wherein the supplemental content comprises a non-audio data; and converting the supplemental content into converted supplemental content having the output time relationship to the primary content, wherein the converted supplemental content comprises second audio data derived from the non-audio data.

2. The method of claim 1, further comprising:

outputting on a first audio channel a first audio representation of the primary content according to the first audio data; and outputting on a second audio channel a second audio representation of the supplemental content according to the second audio data, wherein the second audio channel is different from the first audio channel.

3. The method of claim 2, wherein outputting on the first audio channel further comprises outputting on a left audio channel or a right audio channel, and wherein outputting on the second audio channel further comprises outputting on an opposite one of the left audio channel or the right audio channel.

4. The method of claim 1, further comprising:

outputting on a first user interface a first audio representation of the primary content according to the first audio data; and outputting on a second user interface a second audio representation of the supplemental content according to the second audio data, wherein the second user interface is different from the first user interface.

5. The method of claim 1, further comprising:

generating a first audio signal comprising a representation of the primary content according to the first audio data; and generating a second audio signal comprising a representation of the supplemental content according to the second audio data.

6. The method of claim 5, further comprising:

outputting on a first audio channel the first audio signal; and outputting on a second audio channel the second audio signal, wherein the second audio channel is different from the first audio channel.

7. The method of claim 5, wherein generating the first audio signal further comprises processing the first audio data according to a primary audio format, and wherein generating the second audio signal further comprises processing the second audio data according to a supplemental audio format.

8. The method of claim 7, wherein the primary audio format is different from the supplemental audio format.

9. The method of claim 7, wherein the primary audio format and the supplemental audio format comprise a same audio format.

10. The method of claim 5, further comprising storing the first audio signal and the second audio signal.

11. The method of claim 1, wherein receiving the broadcast radio transmission further comprises receiving the primary content on a first frequency and receiving the supplemental content on a second frequency.

12. The method of claim 1, wherein receiving the broadcast radio transmission further comprises receiving a radio program signal carried on a first frequency modulated radio wave having a first carrier frequency, and receiving radio data system information carried on a second frequency modulated radio wave having a second carrier frequency different from the first carrier frequency.

13. The method of claim 1, wherein receiving the broadcast radio transmission further comprises receiving a radio program signal carried on a first amplitude modulated radio wave having a first carrier frequency, and receiving radio data system information carried on a second amplitude modulated radio wave having a second carrier frequency different from the first carrier frequency, wherein the second carrier frequency is outside of an audible frequency range.

14. The method of claim 13, wherein receiving radio data system information carried on the second amplitude modulated radio wave further comprises receiving the second carrier frequency at a subaudible frequency range.

15. The method of claim 1, further comprising storing the primary content and at least one of the supplemental content or the converted supplemental content.

16. The method of claim 1, wherein receiving the broadcast radio transmission further comprises receiving the supplemental content having an output time relationship relative to the primary content.

17. The method of claim 1, wherein receiving the broadcast radio transmission further comprises receiving the supplemental content having a descriptive relationship relative to the primary content.

18. The method of claim 1, wherein receiving the broadcast radio transmission further comprises receiving the supplemental content having an advertising relationship relative to the primary content.

19. The method of claim 1, wherein receiving the broadcast radio transmission further comprises receiving the primary content comprising radio programming data and receiving the supplemental content comprising radio text data, and wherein converting the supplemental content into converted supplemental content further comprises converting the radio text data into speech data.

20. The method of claim 19, further comprising:

outputting on a first audio channel the radio programming data; and outputting on a second audio channel the speech data, wherein the second audio channel is different from the first audio channel.

21. The method of claim 1, wherein the converted supplemental content comprises second audio data derived from at least one of text, graphics, images and video present in the non-audio data.

22. A computer program product stored on non-transitory computer-readable medium for enhancing radio programming, comprising:

a non-transitory computer-readable medium, comprising:

at least one instruction operable to cause a computer to receive a broadcast radio transmission at a communication device, wherein the broadcast radio transmission comprises primary content and supplemental content having an output time relationship to the primary content, wherein the primary content comprises a first audio data, wherein the supplemental content comprises a non-audio data; and at least one instruction operable to cause the computer to convert the supplemental content into converted supplemental content having the output time relationship to the primary content, wherein the converted supplemental content comprises second audio data derived from the non-audio data.

23. At least one processor for enhancing radio programming, comprising:

a first module for receiving a broadcast radio transmission at a communication device, wherein the broadcast radio transmission comprises primary content and supplemental content having an output time relationship to the primary content, wherein the primary content comprises a first audio data, wherein the supplemental content comprises a non-audio data; and a second module for converting the supplemental content into converted supplemental content having the output time relationship to the primary content, wherein the converted supplemental content comprises second audio data derived from the non-audio data.

24. A communications device for enhancing radio programming, comprising:

means for receiving a broadcast radio transmission, wherein the broadcast radio transmission comprises primary content and supplemental content having an output time relationship to the primary content, wherein the primary content comprises a first audio data, wherein the supplemental content comprises a non-audio data; and means for converting the supplemental content into converted supplemental content having the output time relationship to the primary content, wherein the converted supplemental content comprises second audio data derived from the non-audio data.

25. A communications device for enhancing radio programming, comprising:

a receiver operable to obtain a broadcast radio transmission, wherein the broadcast radio transmission comprises primary content and supplemental content having an output time relationship to the primary content, wherein the primary content comprises a first audio data, wherein the supplemental content comprises a non-audio data; and a data converter operable to change the supplemental content into converted supplemental content having the output time relationship to the primary content, wherein the converted supplemental content comprises second audio data derived from the non-audio data.

26. The device of claim 25, further comprising at least one output device operable to output on a first audio channel a first audio representation of the primary content according to the first audio data, and further operable to output on a second audio channel a second audio representation of the supplemental content according to the second audio data, wherein the second audio channel is different from the first audio channel.

27. The device of claim 26, wherein the first audio channel further comprises a left audio channel or a right audio channel, and wherein the second audio channel further comprises an opposite one of the left audio channel or the right audio channel.

28. The device of claim 25, further comprising at least one output device operable to output on a first user interface a first audio representation of the primary content according to the first audio data, and further operable to output on a second user interface a second audio representation of the supplemental content according to the second audio data, wherein the second user interface is different from the first user interface.

29. The device of claim 25, further comprising at least one output device operable to generate a first audio signal comprising a representation of the primary content according to the first audio data, and further operable to generate a second audio signal comprising a representation of the supplemental content according to the second audio data.

30. The device of claim 29, wherein the at least one output device comprises a first audio channel for outputting the first audio signal, and a second audio channel for outputting the second audio signal, wherein the second audio channel is different from the first audio channel.

31. The device of claim 29, further comprising a processor operable to process the first audio data according to a primary audio format, and further operable to process the second audio data according to a supplemental audio format.

32. The device of claim 31, wherein the primary audio format is different from the supplemental audio format.

33. The device of claim 31, wherein the primary audio format and the supplemental audio format comprise a same audio format.

34. The device of claim 29, further comprising a memory operable to store the first audio signal and the second audio signal.

35. The device of claim 25, wherein the broadcast radio transmission further comprises the primary content on a first frequency and the supplemental content on a second frequency.

36. The device of claim 25, wherein the broadcast radio transmission further comprises a radio program signal carried on a first frequency modulated radio wave having a first carrier frequency, and radio data system information carried on a second frequency modulated radio wave having a second carrier frequency different from the first carrier frequency.

37. The device of claim 25, wherein the broadcast radio transmission further comprises a radio program signal carried on a first amplitude modulated radio wave having a first carrier frequency, and radio data system information carried on a second amplitude modulated radio wave having a second carrier frequency different from the first carrier frequency, wherein the second carrier frequency is outside of an audible frequency range.

38. The device of claim 37, wherein the second carrier frequency comprises a subaudible frequency range.

39. The device of claim 25, further comprising a memory operable to store the primary content and at least one of the supplemental content or the converted supplemental content.

40. The device of claim 25, wherein the broadcast radio transmission further comprises the supplemental content having an output time relationship relative to the primary content.

41. The device of claim 25, wherein the broadcast radio transmission further comprises the supplemental content having a descriptive relationship relative to the primary content.

42. The device of claim 25, wherein the broadcast radio transmission further comprises the supplemental content having an advertising relationship relative to the primary content.

43. The device of claim 25, wherein the broadcast radio transmission further comprises the primary content comprising radio programming data and the supplemental content comprising radio text data, and wherein the data converter is further operable to convert the radio text data into speech data.

44. The device of claim 43, further comprising at least one output device operable to output on a first audio channel the radio programming data, and to output on a second audio channel the speech data, wherein the second audio channel is different from the first audio channel.

45. The device of claim 25, wherein the converted supplemental content comprises second audio data derived from at least one of text, graphics, images and video present in the non-audio data.

* * * * *